Aug. 26, 1969 T. C. MASCARO 3,463,240
POWER DRAGGER
Filed Oct. 17, 1966 4 Sheets-Sheet 1

INVENTOR:
THOMAS C. MASCARO
BY Howson & Howson
ATTYS.

Aug. 26, 1969 T. C. MASCARO 3,463,240
POWER DRAGGER
Filed Oct. 17, 1966 4 Sheets-Sheet 3
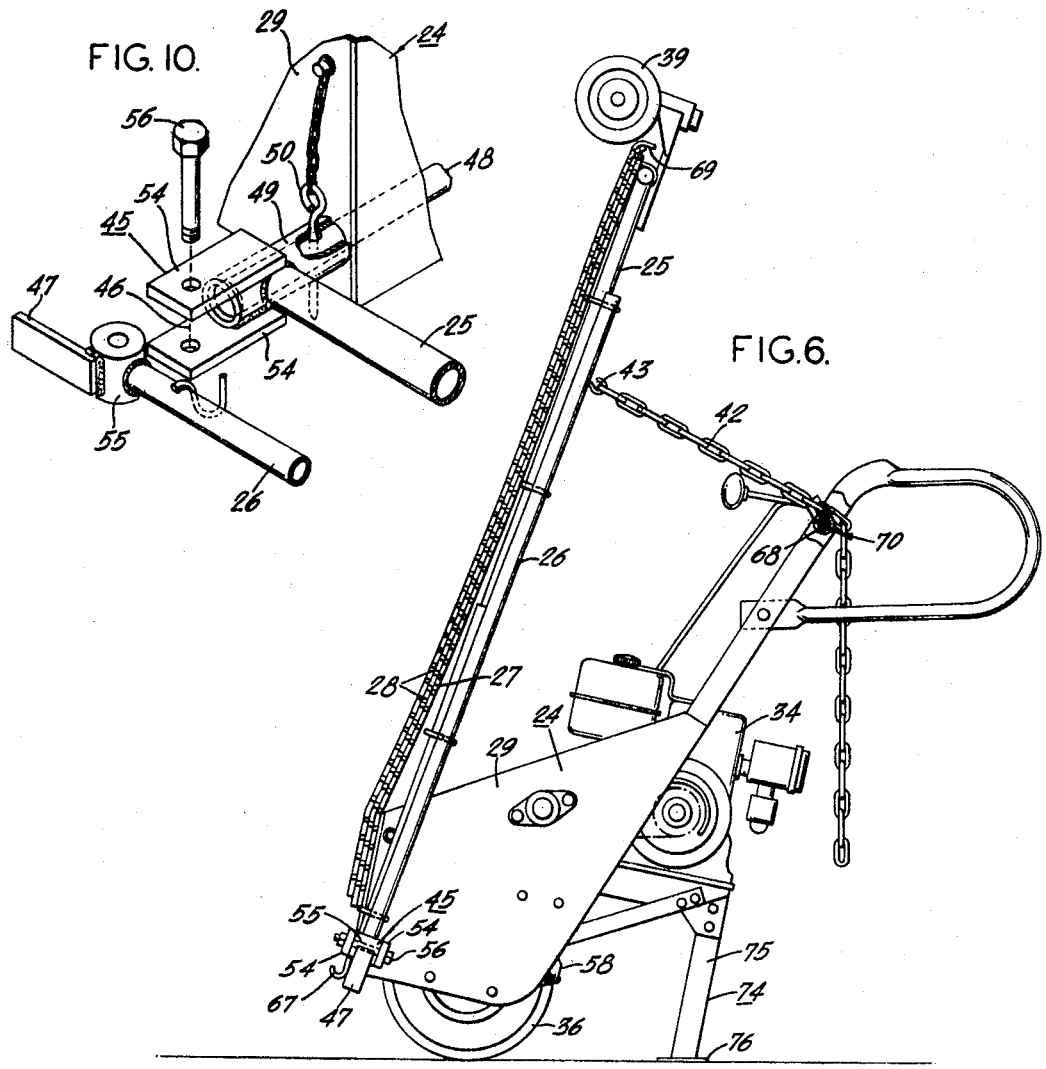
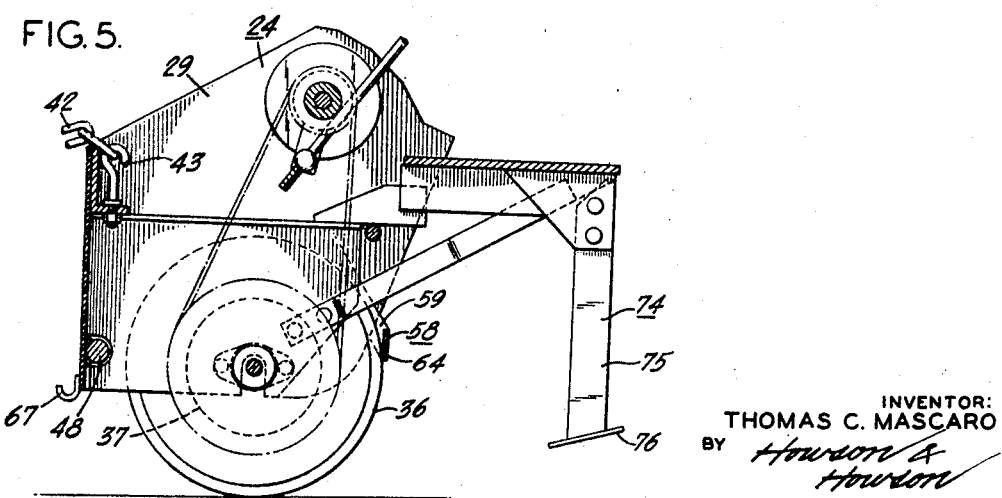
INVENTOR:
THOMAS C. MASCARO
BY Howson & Howson
ATTYS.

Aug. 26, 1969  T. C. MASCARO  3,463,240
POWER DRAGGER
Filed Oct. 17, 1966  4 Sheets-Sheet 4
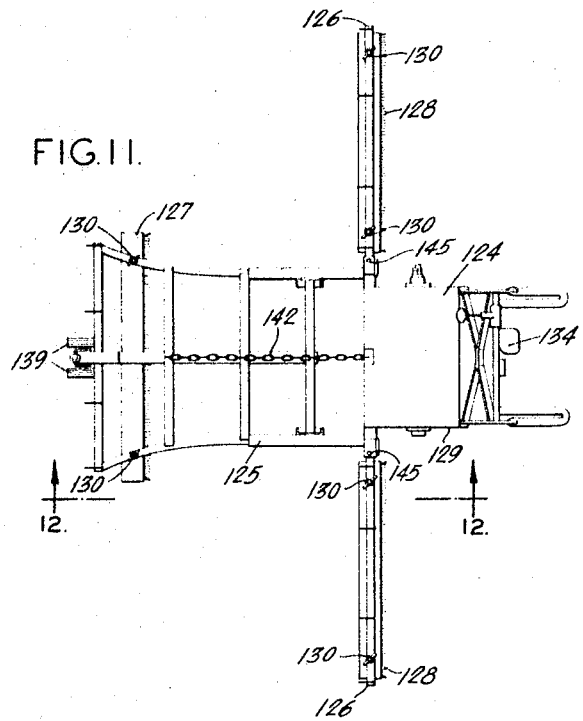
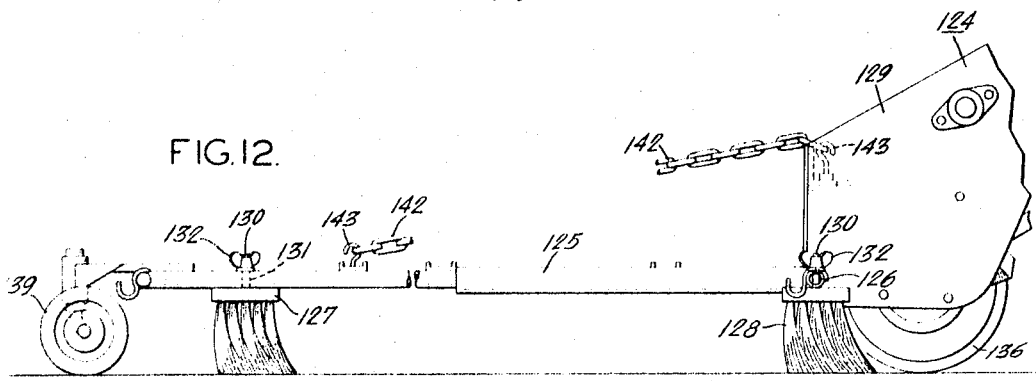
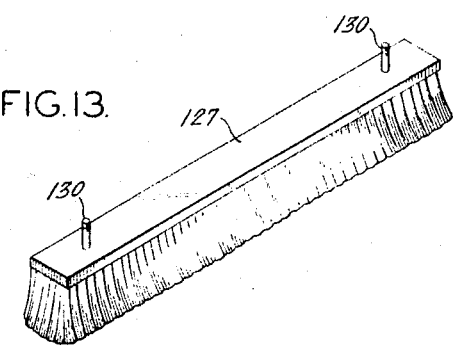
INVENTOR:
THOMAS C. MASCARO
BY Howson &
Howson
ATTYS.

United States Patent Office 3,463,240
Patented Aug. 26, 1969

3,463,240
POWER DRAGGER
Thomas C. Mascaro, West Point, Pa., assignor, by mesne assignments, to Kearny-National Inc., New York, N.Y., a corporation of Delaware
Filed Oct. 17, 1966, Ser. No. 587,309
Int. Cl. A01b 69/00
U.S. Cl. 172—256                              8 Claims

ABSTRACT OF THE DISCLOSURE

A dragger comprising a power vehicle having a frame projecting forwardly therefrom to support a surface treatment device such as a mat or brush. Outriggers are provided on the opposite sides of the vehicle to support additional surface treatment means, the outriggers being mounted normally transverse to the path of movement of the vehicle and being freely pivotal forwardly so that when the vehicle turns, the outriggers do not cause the surface treating devices to tear into the surface. In the present instance, the outriggers are pivoted to the frame so that they may be pivoted forwardly to a storage position and elevated from the surface concurrently with the elevation of the frame to an inactive position.

---

The present invention relates to draggers and has particular application to the surface treatment of cinders, earth, sand, and turf.

A conventional dragger comprises a surface treatment means consisting of one or more mats or brushes and a power vehicle to repeatedly propel the mats or brushes across the surface until the desired degree of treatment is achieved. A dragger having mats for a surface treatment means is commonly referred to as a mat dragger and a dragger having brushes for a surface treatment means is commonly referred to as a brush dragger.

A primary use of the mat dragger is to finish level loose material such as cinders, earth, and sand. In this use, the material is roughly leveled by other means and the mat dragger is run across the material to remove any remaining hollows or undulations.

Another use of the mat dragger is to mix or plant grass seed or other like material upon the ground surface. The seed is spread over the surface and the mat dragger is used to work the seed below the surface.

The mat dragger can also be used to work compost or other material into turf. The compost is spread on top of the turf and the mat dragger run over the compost to work it below the grass blades to a soil surface, Similarly the mat dragger can be used to treat aeration plugs left upon the turf from aeration treatment. The mat dragger will break up the plugs and work them down through the grass blades to the soil surface.

A primary use of the brush dragger is to prepare golf greens for moving. On these greens the turf is very short and any grass blades lying away from the vertical are usually not cut by the mower. The uncut blades grow horizontally and interfere with the playing qualities of the green. The brush dragger is run across the grass, just before mowing, to urge these blades lying away from the vertical into an upright position where they may be cut by the mower.

Heretofore, conventional draggers have had several disadvantages. One type of dragger comprises a section of metal matting or a frame holding brushes and having a towing line. The dragger is towed manually across the surface to be treated.

A principal disadvantage of this type of dragger arises from the great manual effort needed to tow the dragger. The time required to drag an area is long and the effort required quickly exhausts most men.

Another type of dragger comprises a power vehicle having a T-shaped boom extending from the forward part of the unit. A wide metal mat is suspended at its forward edge from the boom and allowed to drag on the ground in front of the power vehicle.

This type of dragger has several disadvantages. A principal disadvantage arises in the maneuvering of the dragger. The power vehicle has only two wheels and is balance on these wheels as it drags the mat over the surface. Where the surface contains snags, the mat will often catch on them, pulling the boom downward, forcing the power vehicle forward and off balance. After the snag is cleared, the boom will swing upward and the power vehicle backward under the force the operator places on the vehicle to overcome the snag and rebalance the vehicle. In rebalancing the vehicle, the power unit is often thrown off balance in the other direction and the operator must again attempt to correct the balance. These movements result in a bobbing motion where the power vehicle is thrown off balance forward and then backwards. The bobbing makes the dragger difficult to steer and sometimes the motion becomes so erratic that the forward part of the boom is forced down into the treated surface thereby damaging it.

The extreme width of the mat also makes the dragger hard to maneuver. When the dragger is turned from one direction of travel to another, the trailing edge of the mat located interior of the turn tears into the surface. This digging damages the turf and causes the dragger to pivot around the mat edge. Since the pivot point of the mat edge differs from the natural turning point of the dragger, the edge pivoting makes the dragger hard to steer.

The length of the mat causes another disadvantage. The maximum length of the mat is limited by the maximum length of the leg of the T-shaped boom the power vehicle can carry. Normally, the mat is short and the amount of mat dragged across any point on the surface is small. Dragging with a short mat is inefficient because the dragger must be driven across the same point on the surface many times to obtain the desired treatment. A longer mat would reduce the number of trips across the same surface point, but the boom cannot carry it, since the length of the boom is limited by the need for providing ready maneuverability.

The size of the mat causes another disadvantage. The rigidity and extreme width of the mat on this dragger prevents the mat from sinking into hollows and undulations in the surface. These hollows and undulations pass under the mat leaving such areas untreated.

Still another disadvantage arises in transporting the dragger between treating areas and in storing the dragger. The dragger has no provision to fold or compact the dragger for storage. The dragger is bulky and requires a large storage area. There is also no provision to lift the mat from the surface when the dragger is driven between treating areas. The mats must be dragged between areas and this slows the dragger down, increases the travel time between the areas, and increases the cost of labor needed to treat the areas.

With the foregoing in mind, a principal object of the present invention is to provide a new and improved dragger which will quickly and inexpensively treat surface areas of cinders, earth, sand, and turf.

Another object of the present invention is to provide a dragger which may be easily operated by one man with a minimum of manual effort.

Another object of the present invention is to provide a dragger which is easy to maneuver.

Still another object of the present invention is to provide a dragger which will not tear the turf when the dragger is turned to a new direction of travel.

Another object of the present invention is to provide a novel mat dragger which has a length of mat on the ground sufficient for efficient surface treatment.

Another object of the present invention is to provide an improved dragger which will treat hollows and undulations in the surface.

Still another object of the present invention is to provide a mechanical dragger which is easy to store and easy to transport between areas to be treated.

Another object of the present invention is to provide a dragger which is highly economical to manufacture and assemble and yet which is fully effective in operation and use.

More specifically another object of the present invention is to provide a dragger for surface treatment having a power vehicle; an outrigger connected to each side of the vehicle and projecting outwardly therefrom; a surface treating means carried by each of the outriggers; a tracking means connecting each of the outriggers to the vehicle to allow the vehicle to change direction of travel without immediate change of direction of the surface treating means carried by the outriggers; an outrigger limit means to limit the angular rotation of each outrigger between a position parallel to the direction of travel of the vehicle and a position at right angles to the direction of travel of the vehicle; a frame mounted at one end on the forward part of the vehicle; a surface treating means carried by the frame, and a stabilizer means engaging the surface and mounted on the frame to support the forward end of the frame above the surface to limit movement of the frame toward the surface.

Other objects and a fuller understanding of the invention may be had by referring to the following description and claims taken in conjunction with the accompanying drawings wherein:

FIG. 3 is a fragmentary sectional view taken along line 3—3 of FIG. 1;

FIG. 4 is a fragmentary rear elevational view as seen from the line 4—4 of FIG. 1;

FIG. 5 is an enlarged fragmentary sectional view taken on the line 5—5 of FIG. 3;

FIG. 6 is a side elevational view of the structure shown in FIG. 1 folded for storage;

FIG. 7 is a reduced plan view of the structure shown in FIG. 1 with certain portions omitted;

FIG. 8 is a view similar to FIG. 7 showing the apparatus in use;

FIG. 9 is an enlarged fragmentary plan view of the structure encircled at 9 in FIG. 8;

FIG. 10 is an enlarged fragmentary perspective view partly exploded of the structure as shown in FIGS. 2 and 9;

FIG. 11 is a plan view of a machine embodying the present invention wherein the mats are replaced by brushes;

FIG. 12 is an enlarged fragmentary side elevational view of the structure shown in FIG. 11; and FIG. 13 is an enlarged perspective view showing a brush used in the apparatus of FIG. 11.

Figure 1:
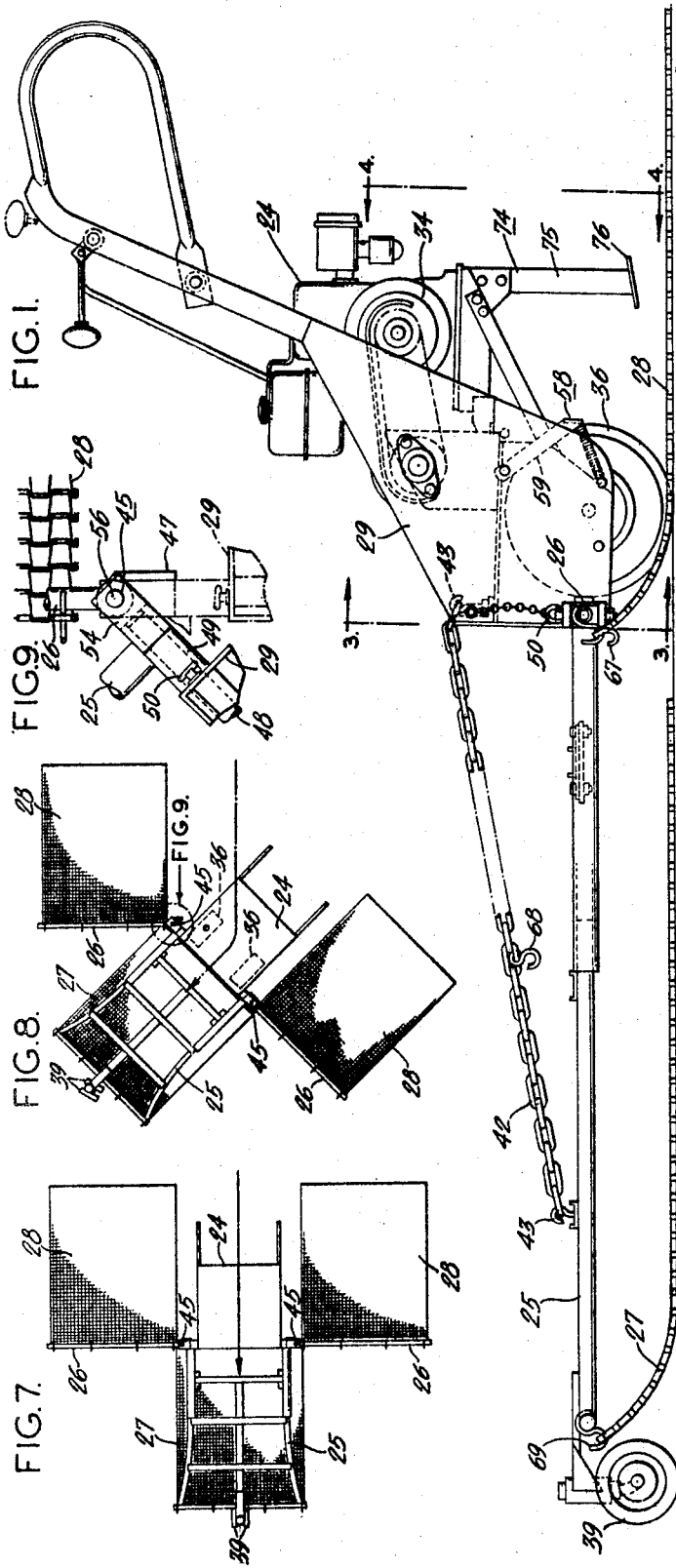
FIG. 1 is a side elevational view of a mat dragger embodying the present invention.

In accordance with the present invention the power dragger comprises a power vehicle 24, having a frame 25 mounted forward and outriggers 26 mounted on each side of the power vehicle 24. The frame 25 and outriggers 26 each carry a surface treating means.

FIGS. 1 through 10 show a first embodiment of the invention having a forward mat 27 and two side mats 28 as surface treating means. The frame 25 carries the forward mat 27 and the outriggers 26 each carry a side mat 28. The mats are attached at their forward ends to their associated frame or outriggers to allow the remaining portion of each mat to drag upon the surface to be treated.

To insure coverage over the entire path dragged by the power dragger the mats 28 on the outriggers 26 are mounted to overlap part of the area covered by the mat 27 on the frame 25.

Figure 2:
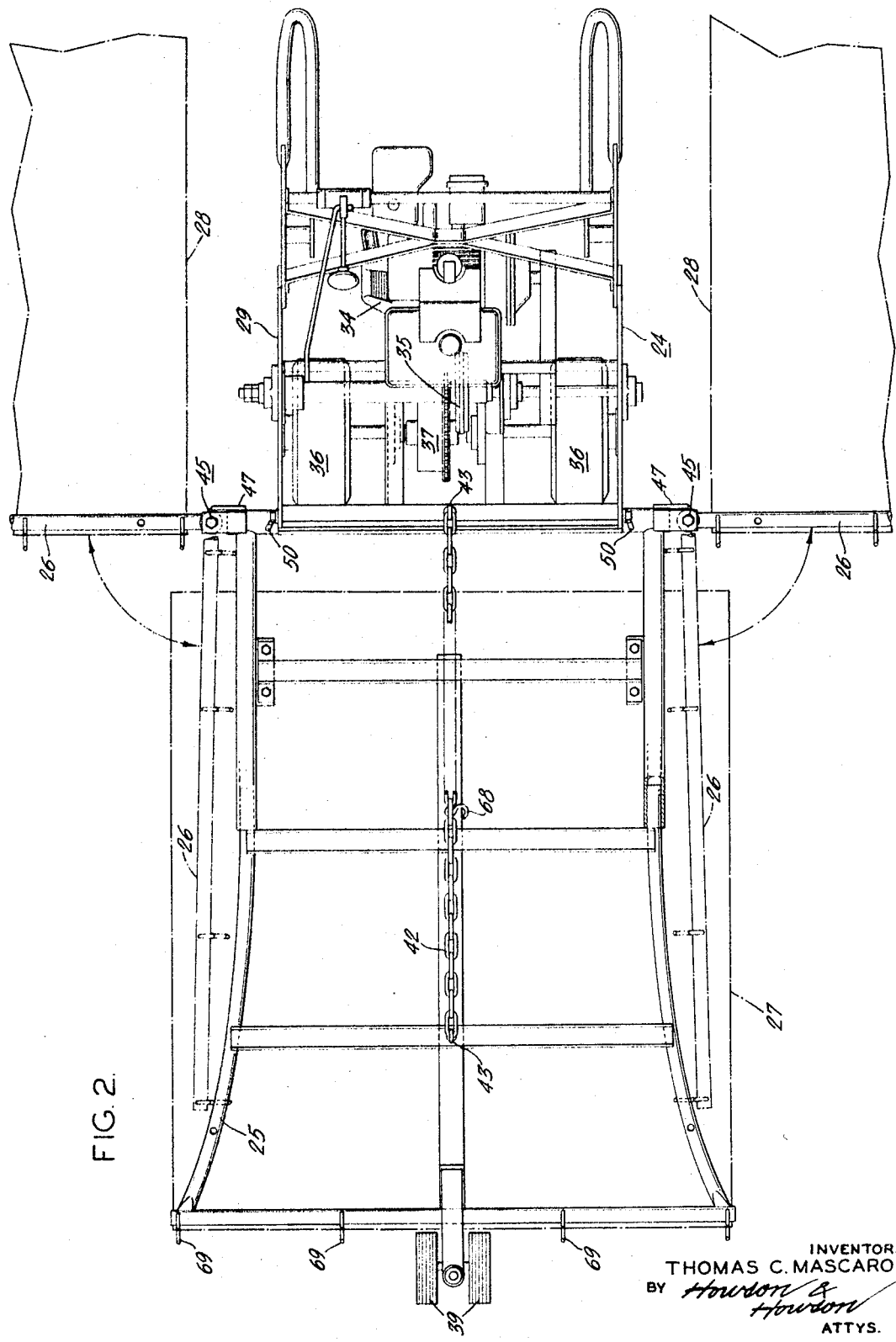
FIG. 2 is a plan view of the structure shown in FIG. 1.

Referring now more particularly to the invention as shown in FIGS. 1 and 2, the power vehicle 24 comprises a vehicle body 29 which mounts a power means 34, in the present instance a conventional gasoline motor, and a speed reduction and clutch assembly 35 to control the power from the power means 34 to two rear wheels 36 mounted beneath the body 29 and driven by the power means 34. To make the dragger easy to turn from one direction to another, the rear wheels 36 are connected to the speed reduction and clutch assembly 35 through a differential gear 37 to allow them to rotate at different speeds.

In order to prevent bobbing and subsequent damage to the treated surface by the frame 25 digging into the surface, for example when the mat 27 catches a surface snag, a stabilizer means is provided. The stabilizer means comprises a pair of wheels 39 engaging the surface and mounted on the frame 25 to support the frame 25 and limit the movement of it toward the surface when the forward mat 27 catches on the snag. The wheels 39 support the frame 25 in a plane parallel to the plane of the treated surface and are located forwardly on the front end of the frame 25 to allow the frame 25 to carry a mat having sufficient length to provide efficient surface treatment.

To make the power vehicle 24 easy to handle, and to remove the bulk of the weight from the stabilizer wheels 39, the power means 34 is positioned rearwardly of the rear wheels 36 to counterbalance the weight of the frame 25 and the stabilizer wheels 39. A tension member, in this case a chain 42, is connected between the power vehicle 24 and the frame 25 by hooks 43 mounted respectively on the power vehicle 24 and the frame 25.

In order to prevent damage to the treated surface as the dragger is turned from one direction to another, a tracking means is provided. The tracking means prevents the mat which is located interiorly of the turn from tearing into the surface as the dragger is turned. The tracking means 45, as shown in FIGS. 7, 8 and 9, is provided intermediate the power vehicle 24 and the outriggers 26 to permit the vehicle to change direction without immediate change of direction of the outrigger which is on the inside of the turn. In the present instance, the tracking means 45 comprises a pivotal joint 46 between each outrigger and the power vehicle. The joint has an outrigger limit means 47 to limit the angular rotation of the outriggers 26 to a forward direction relative to the vehicle. Preferably, the outriggers 26 pivot in a plane substantially parallel with the plane of the surface being treated.

As shown in FIGS. 3 and 10 the pivotal joint 46 comprises a shaft 48 running through the forward part of the vehicle 24 and extending outward from the vehicle 24 to each side to mount both the forward frame 25 and the outriggers 26. On each side, the forward frame 25 terminates in a tubular socket 49 which is fitted over the end of the shaft 48 and anchored in place by a locking pin 50. The socket 49 has a pair of outrigger mounting plates 54 fixed thereto and adapted to receive therebetween a sleeve 55 at the end of the outrigger 26. The plates 54 are provided with registering apertures aligned with the bore of the sleeve 55 to receive a suitable pivot means such as a bolt 56 passing through the apertures and the bore.

Angular rotation of the outriggers 26 on the pivot bolt 46 is limited between a position at right angles to the direction of travel and a position forward and parallel to the direction of travel of the vehicle 24, shown in full and broken lines respectively in FIG. 2. In this case the outrigger limit means comprises a finger 47 attached to the sleeve 55. The finger 47 bears against the socket when the outrigger 26 is at the right angle position, and prevents the outrigger 26 from moving backward from this position. The outrigger 26 is limited in the position forward and parallel to the direction of travel of the vehicle 24 by the frame 25.

In operation of the tracking means 45, as the dragger is turned from one direction of travel to another, the interior outrigger 26 and its associated mat 28 on the turn will not immediately change direction but will pivot forward relative to the frame 25 to maintain the old direction of travel. When the turn is completed the outrigger 26 and its mat 28 will return to the position at right angles to the direction of travel.

When the mat dragger is driven over moist dirt, mud, fresh grass, or similar material, such material will accumulate upon the rear wheels 36 causing a loss of traction between the rear wheels 36 and the surface. To insure positive traction, a scraper 58 is provided to remove the material from the rear wheels 36 (see FIGS. 1 and 4). In the present instance, the scraper 58 comprises two levers 59 each pivotally connected at one end to the vehicle body 29 adjacent each of the rear wheels 36. A horizontal scraping blade 64 is connected at each of its ends to the other ends of the two levers 59 and bears against the two rear wheels 36. Springs are mounted between the scraping blade 64 and the body 29 to urge the scraping blade 64 against the wheels for scraping.

To facilitate the transport of the dragger between treating areas, the mats are supported above the treating surface to allow the dragger to be driven from one treating area to another without the mats being dragged on the surface. To place the dragger in the transport configuration the forward mat 27 is held above the surface by fastening the trailing end of the mat 27 to a J hook 67 located at the center forward part at the body 29. The outriggers 26 are pivoted forward as shown in FIG. 2 against the frame 25 and the side mats 28 are folded on top of the frame 25 to prevent dragging of the mats during travel. In this manner the mats are above the surface and the dragger may be driven smoothly and quickly, without dragging, to the next area to be treated.

To facilitate easy storing and save storage space, the dragger may be folded from an operative position to a compact storage position. As shown in FIG. 6, the mats 28 on the outriggers 26 are removed and are placed on hooks 69 used to mount the forward mat 27 on the frame 25. The outriggers 26 are folded forward against the frame 25, the locking pins 50 are removed from the tubular sockets 49 and the frame 25 is pivoted to a near vertical position. The chain 42 is disconnected from the hook 43 on the power vehicle 24 and an S hook 68 on the chain, near its center, is hooked to the power vehicle 24 at 70 to hold the frame in the vertical position.

In the compact storage position the power vehicle 24 tends to topple backwards. To prevent this, a stand 74 is provided comprising a column 75 having one end attached to the vehicle body 29 and the other end forming a skid 76 which contacts the surface.

FIGS. 11 through 13 show an additional embodiment of the invention adapted to carry a surface treating means comprising brushes.

The illustrated apparatus comprises a power vehicle 124 similar to that shown in the first embodiment having a frame 125 mounted forward on the vehicle 124 and outriggers 126 mounted on each side of the vehicle 124. The frame 125 carries a forward brush 127 and the outriggers 126 each carry a side brush 128.

In the present instance the brushes are mounted on the frame 125 and outriggers 126 by bolts 130 or threaded studs projecting upwardly from the brushes. The frame and outriggers have openings 131 to accommodate the bolts 130 and the bolts 130 are anchored in the openings by wing nuts 132. To insure coverage over the entire path dragged by the power dragger, the side brushes 128 on the outriggers are mounted to partially overlap the area covered by the forward brush 127 on the frame 125.

In the present embodiment the power vehicle is similar to that shown in the first embodiment and comprises a vehicle body 129, a power means mounted within the body 129, and a speed reduction and clutch assembly to control the power from the power means to two rear wheels 136 mounted beneath the body 129 and driven by the power means.

To make the dragger easy to turn from one direction to another, the rear wheels 136 are connected to the speed reduction and clutch assembly through a differential gear to allow them to rotate at different speeds.

In order to prevent bobbing and subsequent damage to the treated surface by the frame 125 digging into the surface, when the forward brush 127 is forced downward to the surface by a snag, a stabilizer means is provided similar to that of the first embodiment. The stabilizer means comprises a pair of wheels 139 engaging the surface and mounted on the frame 125 to support the frame 125 and limit the movement of it toward the surface when the forward brush 127 catches on the snag. The wheels 139 support the frame 125 in a plane parallel to the plane of the treated surface and are located forward of the front end of the frame 125.

To make the power vehicle 124 easy to handle, and to remove the bulk of the weight from the stabilizer wheels 139, the power means 134 is positioned rearwardly of the rear wheels 136 to counterbalance the weight of the frame 125 and the stabilizer wheels 139. A tension member, in this case a chain 142, is connected between the power vehicle 124 and the frame 125 by hooks 143 mounted respectively on the power vehicle 124 and the frame 125.

In order to prevent the trailing edge of the side brush 128 located interior of a turn, from tearing into and damaging the treated surface as the brush dragger is turned from one direction to another, a tracking means 145 is provided. The tracking means 145 is similar to that of the first embodiment and is connected intermediate the power vehicle 124 and the outriggers 126 to permit the power vehicle 124 to change direction without immediate change of direction of the outriggers 126. In the present instance the tracking means comprises a pivotal joint having an outrigger limit means to limit the angular rotation therearound of the outriggers 126. Preferably, the outriggers 126 pivot in a plane substantially parallel with the plane of the surface being treated.

In operation of the tracking means 145, as the dragger is turned from one direction of travel to another, the interior outrigger 126 and brush 128 on the turn will not immediately change direction but will pivot forward to maintain the old direction of travel. When the turn is completed, the outrigger 126 and the brush 128 will return to the position at right angles to the direction of travel.

In order to facilitate easy storing and save storage space, the dragger may be folded from an operative position to a compact storage position similar to that of the first embodiment. The outriggers 126 are folded forward against the frame 125 and the frame 125 is rotated on its mounting to a near vertical position. The chain 144 holds the frame 125 in the near vertical position.

As in the previous embodiment, in the compact storage position, the power vehicle 124 tends to topple backwards. To prevent this, a stand is provided comprising a column having one end attached to the vehicle body and the other end forming a skid which contacts the surface.

While the particular embodiments of the present invention have been herein illustrated and described, it is not intended to limit the invention to such disclosure.

I claim:

1. A power dragger for surface treatment comprising a power vehicle; at least one outrigger connected to said vehicle and normally projecting transversely outwardly therefrom; surface treating means carried by said outrigger and having an operative position alongside said vehicle in a plane substantially parallel with the plane of the surface being treated; a pivotal joint connecting said vehicle and said outrigger for pivotal movement and outrigger limit means to limit the pivotal movement of said outrigger and its surface treating means within the operative plane thereof rearwardly relative to said vehicle from said normal transverse projection and to permit free pivotal movement forwardly relative to said power vehicle, thereby to allow said vehicle to change the direction of its path of travel toward said outrigger without immediate change in the direction of the path of travel of said surface treating means; a frame mounted to project forwardly of said power vehicle; separate surface treating means carried by said frame; and stabilizer means mounted on said frame at its forward end to engage said surface and support said frame above said surface, limiting movement of said frame towards said surface.

2. A power dragger for surface treatment as recited in claim 1, including a second outrigger connected to and normally projecting transversely outwardly from the opposite side of said vehicle; additional surface treating means carried by said second outrigger and having an operative position alongside said vehicle in a plane substantially parallel with the plane of the surface being treated; and a second pivotal joint connecting said vehicle and said second outrigger to allow the vehicle to change the direction of its path of travel without immediate change in the direction of the path of travel of said additional surface treating means.

3. A power dragger for surface treatment as recited in claim 1 wherein said stabilizer means comprises at least one wheel mounted on the forward end of said frame, said wheel supporting said frame in a plane substantially parallel to the plane of said surface.

4. A power dragger for surface treatment as recited in claim 1 wherein said pivotal joint comprises at least one outrigger mounting plate mounted on said vehicle and extending outward and to the side of said vehicle; and a pivot means connecting said outrigger to said mounting plate for pivotal movement in a plane parallel to said surface.

5. A power dragger for surface treatment as recited in claim 4 including a shaft extending outward and to the side of said vehicle; and a tubular socket fitted over the end of said shaft wherein said frame is connected to said socket to pivotally mount said frame on said power vehicle between an operative position in a plane parallel to said surface and a storage position substantially perpendicular to the plane of said treated surface.

6. A power dragger for surface treatment as recited in claim 5, wherein said mounting plate is fixed to said socket whereby said outrigger is pivoted with said frame.

7. A power dragger for surface treatment as recited in claim 1 wherein said surface treating means comprises a mat.

8. A power dragger for surface treatment as recited in claim 1 wherein said surface treating means comprises a brush.

References Cited

UNITED STATES PATENTS

| | | | |
|---|---|---|---|
| 1,168,713 | 1/1916 | Cummins | 172—189 X |
| 2,370,468 | 2/1945 | Hyland | 172—310 X |
| 3,177,638 | 4/1965 | Johnson | 56—7 |
| 3,333,645 | 8/1967 | Gustafson | 172—456 |

FOREIGN PATENTS 287,362  3/1928  Great Britain.

ROBERT E. BAGWILL, Primary Examiner

STEPHEN C. PELLEGRINO, Assistant Examiner

U.S. Cl. X.R.

172—189, 456